(No Model.)  8 Sheets—Sheet 1.

F. LEMAN.
MACHINE FOR THE MANUFACTURE OF GEAR WHEELS.

No. 380,498. Patented Apr. 3, 1888.

Fig. 1.

Witnesses:
Chas. J. Williamson
Henry C. Hazard

Inventor:
Frank Leman, by
Crindle & Russell, his Attys.

(No Model.)

F. LEMAN.

MACHINE FOR THE MANUFACTURE OF GEAR WHEELS.

No. 380,498. Patented Apr. 3, 1888.

Witnesses:
Chas. J. Williamson.
Henry C. Hazard.

Inventor:
Frank Leman, by
Prindle & Russell, his Attys (No Model.) 8 Sheets—Sheet 5.

F. LEMAN.
MACHINE FOR THE MANUFACTURE OF GEAR WHEELS.

No. 380,498. Patented Apr. 3, 1888.

(No Model.) 8 Sheets—Sheet 7.

F. LEMAN.
MACHINE FOR THE MANUFACTURE OF GEAR WHEELS.

No. 380,498. Patented Apr. 3, 1888.

Fig. 7

UNITED STATES PATENT OFFICE.

FRANK LEMAN, OF ELGIN, ILLINOIS.

MACHINE FOR THE MANUFACTURE OF GEAR-WHEELS.

SPECIFICATION forming part of Letters Patent No. 380,498, dated April 3, 1888.

Application filed August 5, 1886. Serial No. 210,099. (No model.)

*To all whom it may concern:*

Be it known that I, FRANK LEMAN, of Elgin, in the county of Kane, and in the State of Illinois, have invented certain new and useful Improvements in Mechanism for the Manufacture of Gear-Wheels; and I do hereby declare that the following is a full, clear, and exact description thereof, reference being had to the accompanying drawings, in which—

Letters of like name and kind refer to like parts in each of the figures.

The object of my invention is to facilitate the cutting of the teeth of gear-wheels; and to this end said invention consists, principally, as an improvement in means for cutting the teeth of wheels, in an organization in which are combined a journaled head that is adapted to be partially rotated upon its axis, two wheel-arbor-holding quills which are journaled within said head and are each adapted to be rotated step by step when caused to occupy a certain predetermined position by the rotation of said head, and a rotating cutter that is adapted to move lengthwise of the wheel-arbor of the active quill between each of its partial rotations, substantially as and for the purpose hereinafter specified.

It consists, further, as an improvement in means for cutting the teeth of wheels, in an organization in which are two or more wheel-arbor-holding quills that are adapted to have a step-by-step rotation when brought into position before a cutter and to remain at rest when moved away from said cutter, substantially as and for the purpose hereinafter shown.

It consists, further, as an improvement in means for cutting the teeth of wheels, in a mechanism in which there are combined with a rotatable index-plate a rock-shaft that has one of its arms moved toward or from said index-plate by suitable means, a pawl which is pivoted upon said arm and by such action is adapted to engage with the toothed periphery of said index-plate, and an adjustable stop that is adapted to regulate the movement of said pawl upon its pivotal bearing, and thereby determine the peripheral travel of its engaging end, substantially as and for the purpose hereinafter set forth.

It consists, finally, as an improvement in means for cutting the teeth of wheels, in a mechanism in which are combined a rotatable index-plate, a rock-shaft arm that carries an operating-pawl and by its movements toward and from said index-plate causes said pawl to move over or upon the periphery of the same, and a locking-pawl that is adapted to engage with the toothed periphery of said index-plate and is lifted out of such engagement by the movement of said arm which retracts said operating-pawl, substantially as and for the purpose hereinafter shown and described.

Figure 1:
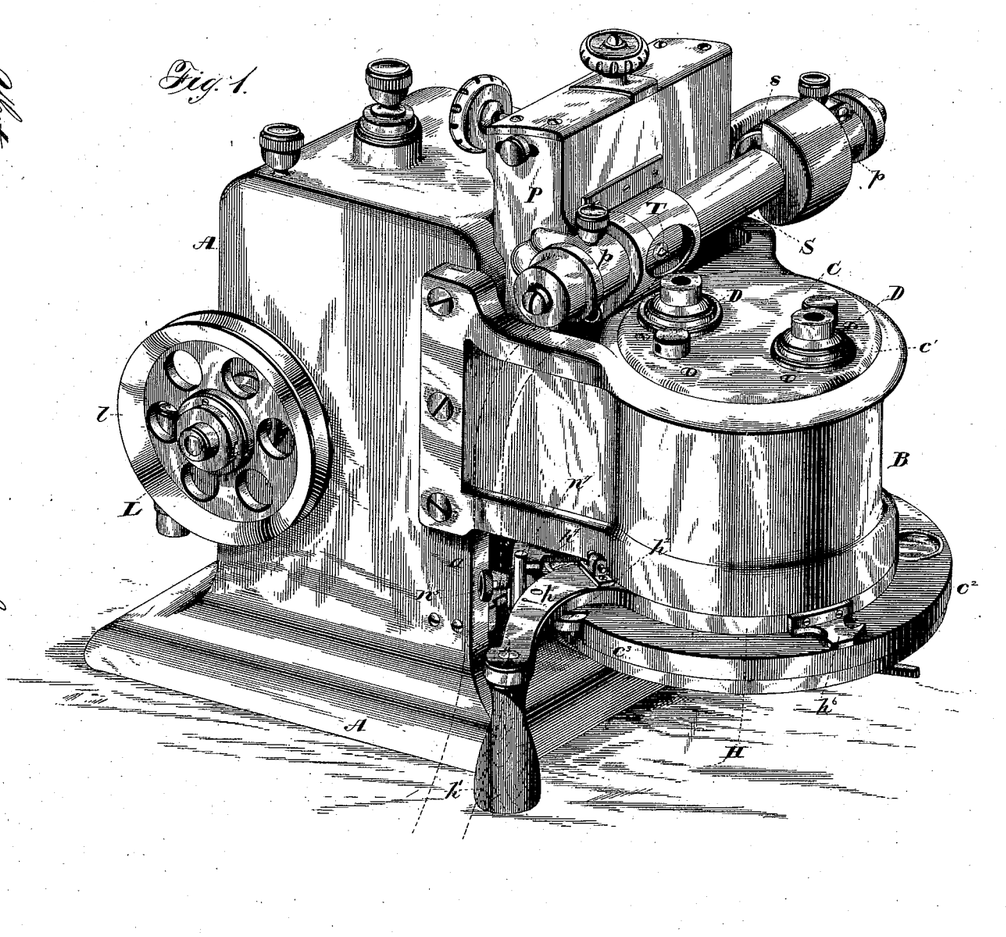
Figure 1 is a perspective view of my machine as arranged for use.
Figure 2:
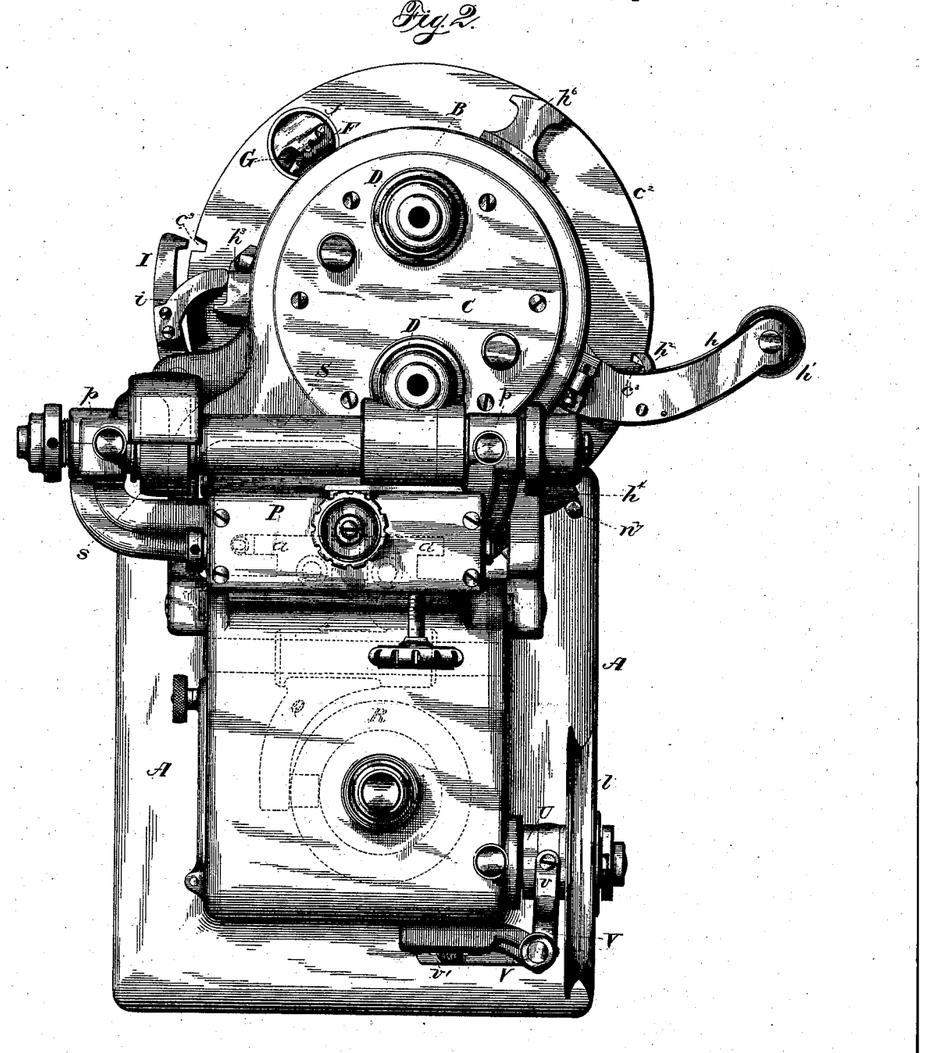
Fig. 2 is a plan view of the upper side of the same.
Figure 3:
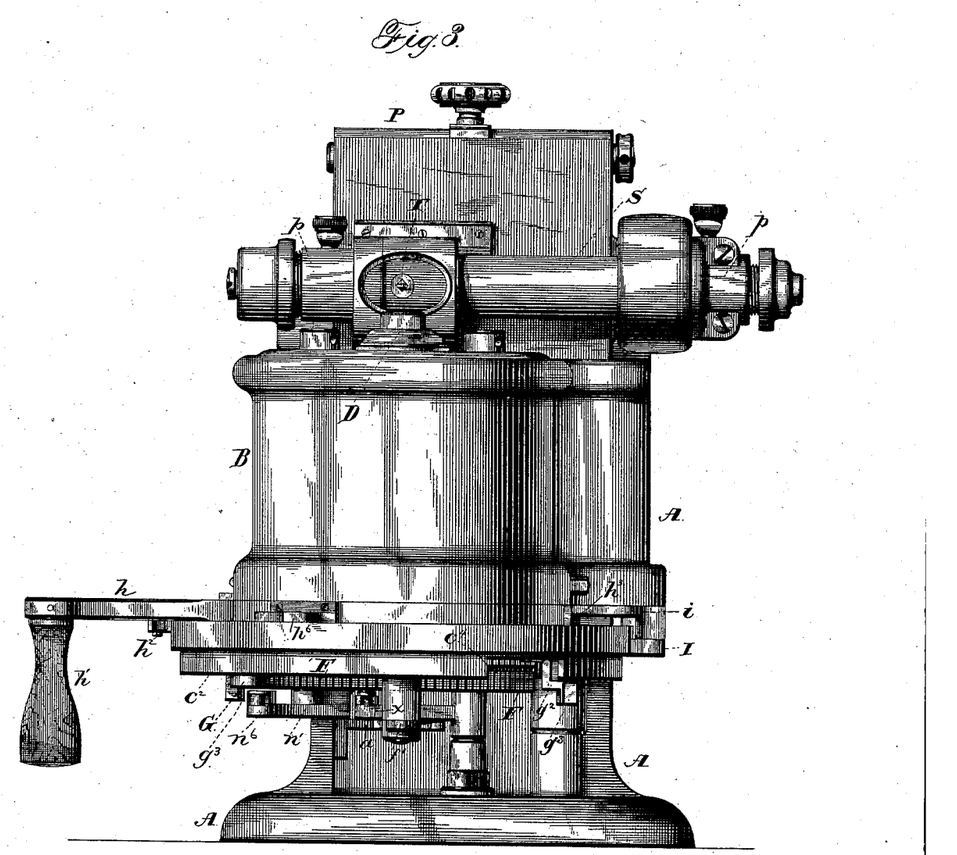
Fig. 3 is an elevation of the front side of said machine.
Figure 4:
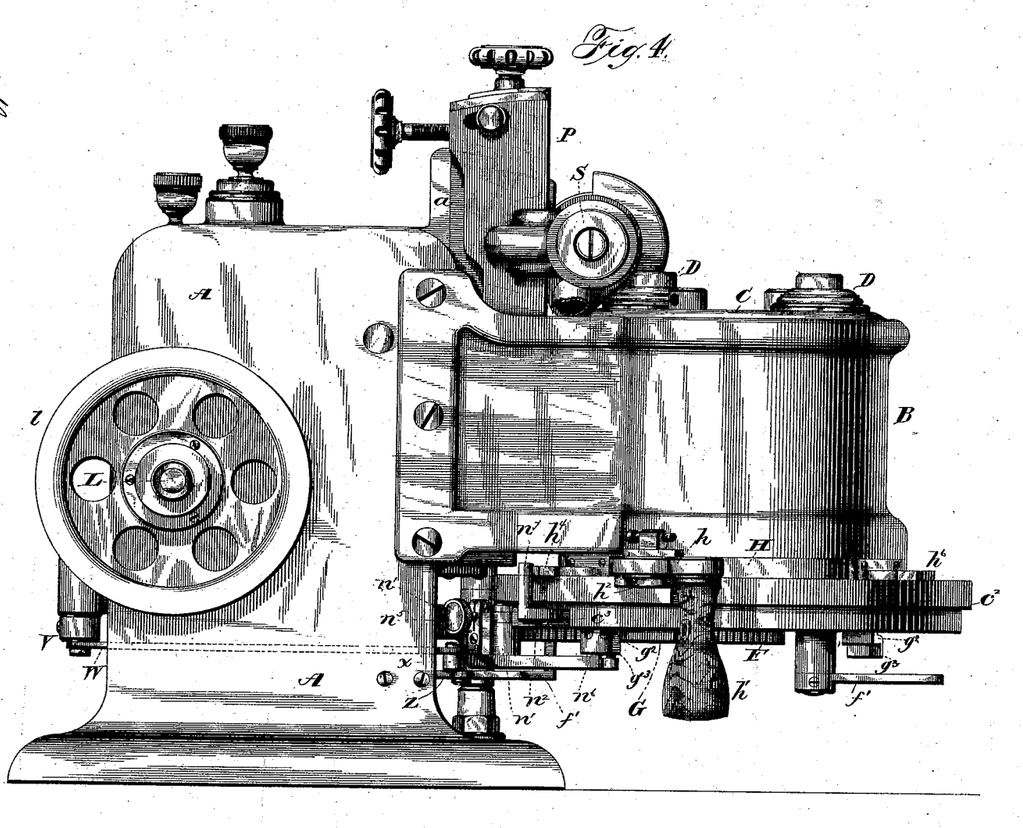
Figs. 4 and 5 are elevations of opposite sides of the same.
Figure 5:
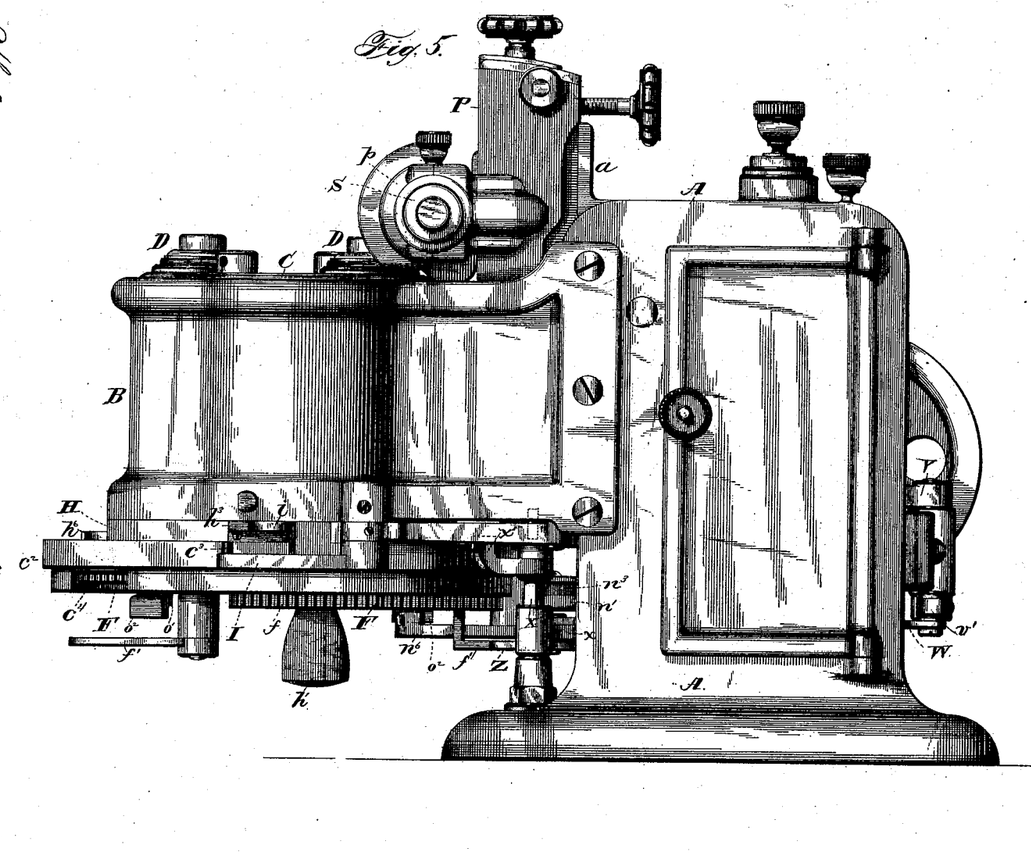
Figure 6:
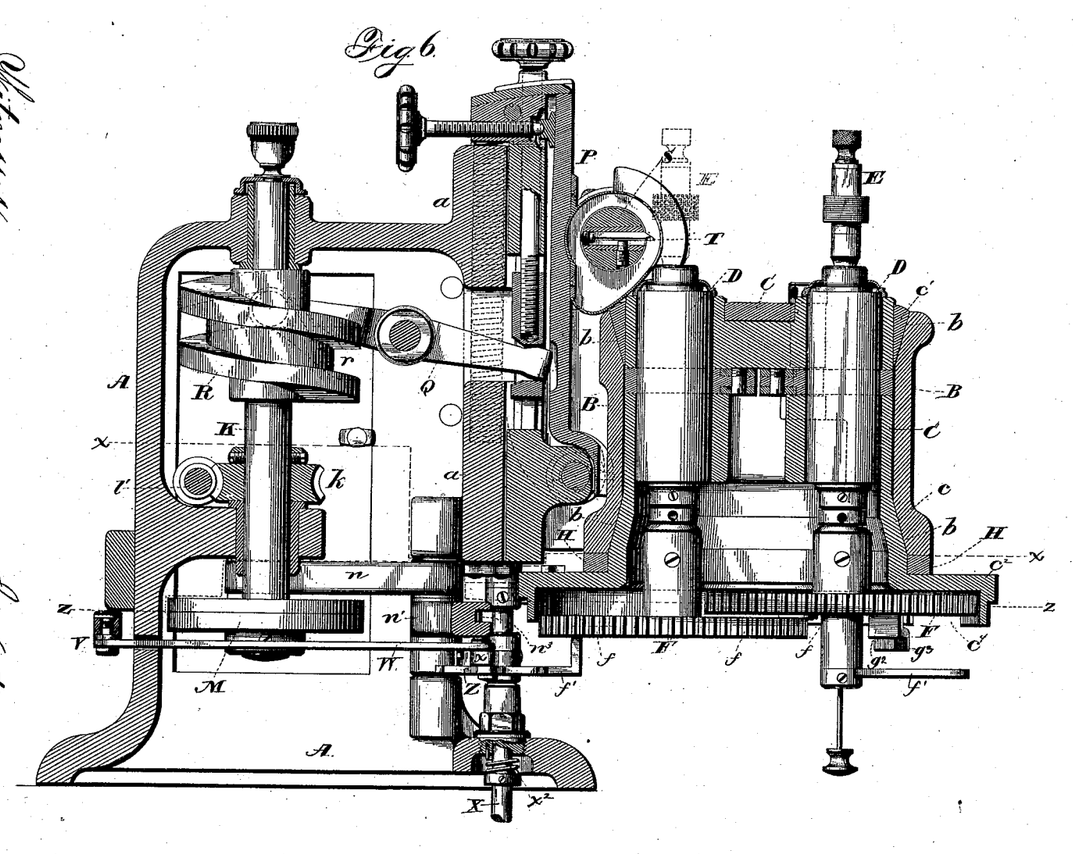
Fig. 6 is a vertical central section upon a line passing from front to rear.
Figure 7:
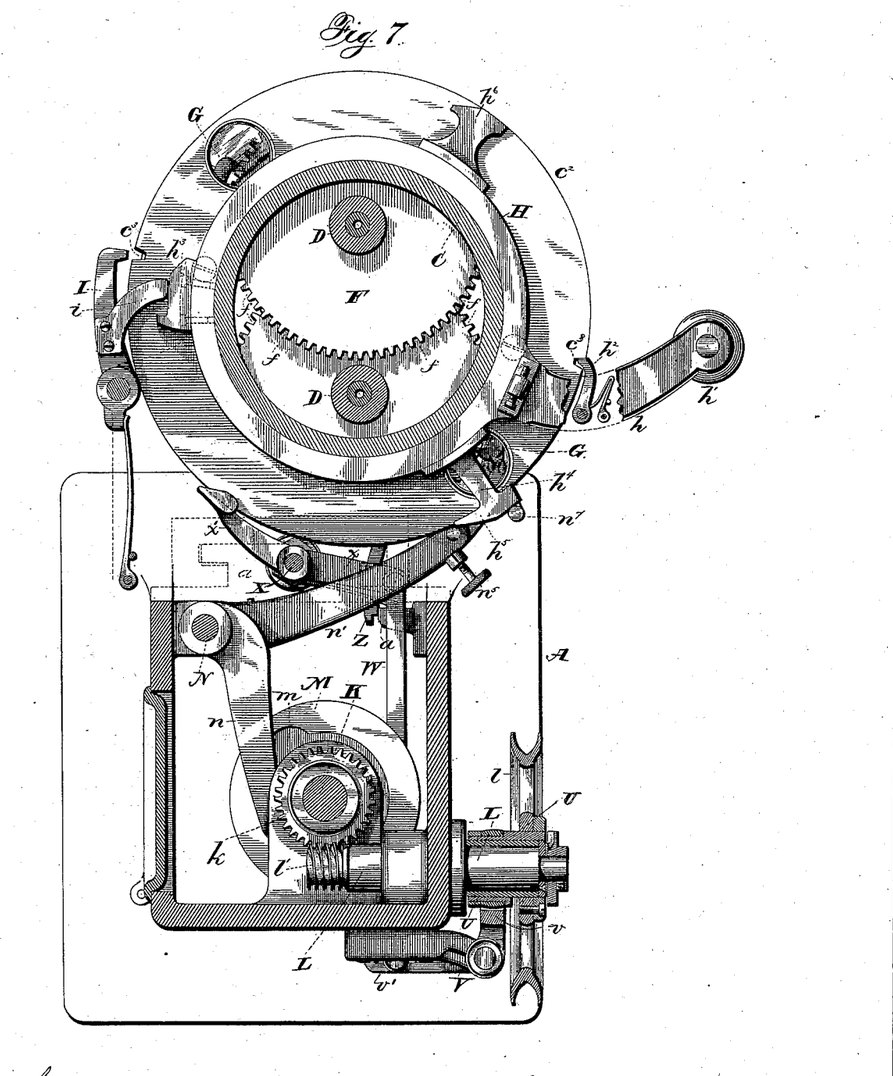
Fig. 7 is a horizontal section upon line $x\,x$ of Fig. 6.
Figure 8:
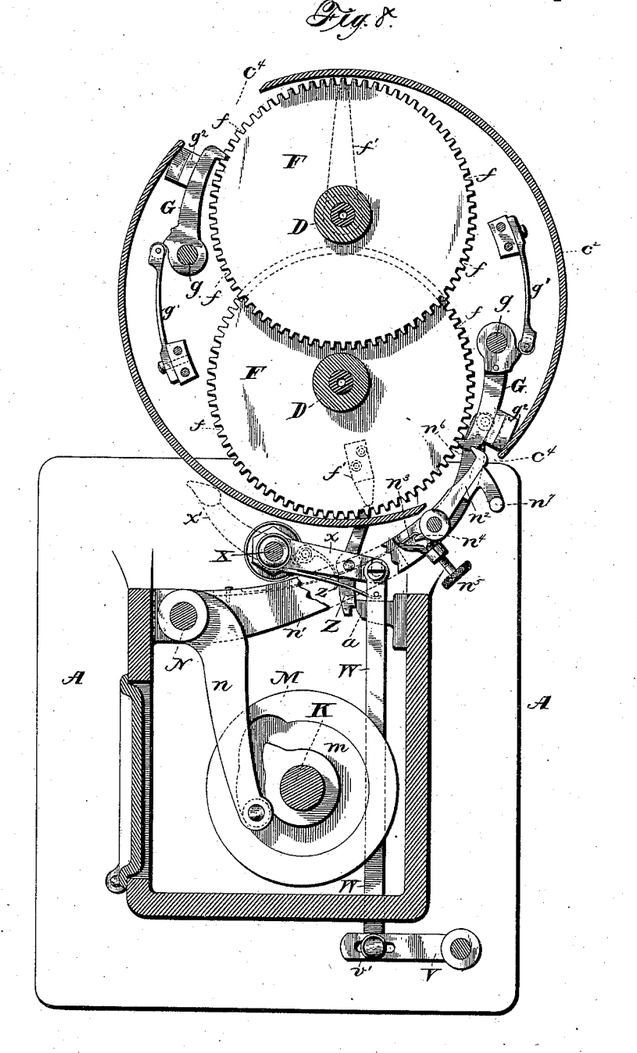
Fig. 8 is a like view upon line $z\,z$ of same figure.

In the construction of my machine I employ a frame, A, which has a general rectangular form and upon its front side is provided with a cylindrical housing, B, that is preferably formed separate from and then secured to said frame. Said housing is arranged with its axis in a vertical line and has a plain cylindrical interior, with its ends $b$ made flaring, as shown in Fig. 6.

Fitted to the interior of the housing B is a head, C, which conforms thereto in shape and size and is provided with one fixed conical end bearing, $c$, and one detachable end bearing, $c'$, that fit within the flaring ends $b$ of said housing and operate to insure the relative longitudinal position of said head, while permitting its free rotation. The lower end of said head is provided with a peripheral flange, $c^2$, which extends radially outward and then downward, as shown in Fig. 6, and operates to cover and protect certain mechanism, hereinafter described.

Journaled within the head C at points equidistant from its center and upon opposite sides of the same are two quills, D, of usual construction, each of which is adapted to receive and carry an ordinary wheel-cutting arbor, E. To the lower end of each quill is secured an index-plate, F, that has any desired number of equidistant peripheral notches, $f$, and is engaged by a locking-pawl, G, which is secured upon the lower end of an arbor, $g$, that is journaled vertically within said head. Said pawl is held with a yielding pressure in engagement with said index-plate by means of a spring, $g'$, which is secured at one end upon said head C and at its opposite end bears upon the outer side of the pawl. The head C is adapted to be revolved within its housing by means of a ring, H, which is journaled upon its lower portion immediately above the flange $c^2$ and is provided with a radially-projecting arm, $h$, to which is attached an operating-handle, $h'$. To the lower side of said arm is pivoted a spring-operated pawl, $h^2$, that is adapted to engage with either of two oppositely-located peripheral notches, $c^3$, and thereby lock said head and ring together, so as to enable the former to be partially rotated when the latter is turned in the right direction. When said ring is moved rearward, said pawl will be released from engagement with said notch $c^3$ and will ride over the plain portion of the periphery of said flange until the opposite notch is reached, when it will drop into engagement with the same. The head C is locked in position with the quills D in a line with its axis and the lateral center of the frame A by means of a pawl, I, which is pivoted upon the housing B in position to enable it to engage with the rearmost of the notches $c^3$. Said locking-pawl is released from engagement, when it is desired to rotate said head, by means of a lug, $h^3$, that is secured upon and projects radially from the ring H at a point nearly opposite to the operating-arm $h$ and engages with an arm, $i$, which extends inward and forward from said pawl. When said ring is moved to the rear limit of its motion, said lug passes behind said arm and moves said pawl out of engagement with its notch $c^3$ just as the pawl $h^2$ drops into engagement with the opposite notch $c^3$, and thus leaves said head free to be moved upon the forward movement of said ring. As soon as the movement of the flange $c^2$ has equaled the width of one of its notches, said unlocking-lug $h^3$ passes out of engagement with said arm $i$, and said pawl is left in position for engagement with the opposite notch when reached by the same.

In the normal position of the head C one of its quills D is adjacent and the other opposite to the frame A, as shown, and the former is intended for active use, while the latter when occupying such position is at rest, and its period of idleness is utilized for the removal of the completed wheels and the placing in position of wheel-blanks.

The operating-quill requires to be given a step-by-step rotation, which is accomplished by the following-described mechanism, viz: Journaled vertically within the rear central portion of the frame A is a shaft, K, that is caused to rotate by means of a horizontally-journaled shaft, L, which extends laterally through said frame and is provided upon its outer end with a belt-pulley, $l$, and upon its inner end with a worm, $l'$, that meshes with a worm-wheel, $k$, upon said shaft K. Secured to the lower portion of said shaft K is a cam-plate, M, which within its face is provided with a cam-groove, $m$, that engages with the outer end of one arm, $n$, of the rock-shaft N, which latter is journaled vertically near the front, at one side of said frame.

The rock-shaft N is provided with a second arm, $n'$, which extends forward and outward and to its front end has pivoted a pawl, $n^2$, that has a hooked end and is adapted to engage with the teeth $f$ of the index-plate F. Said pawl has its engaging end held inward toward said index with a yielding pressure by means of a spring, $n^3$, that is secured at one end to said rock-shaft arm and has its opposite end in engagement with a tail-piece, $n^4$, upon the rear end of the pawl, the arrangement being such that the rotation of the shaft K will cause said index-plate and its quill D to have a step-by-step rotation around their axis.

In order that the inward motion of the pawl $n^2$ may be regulated so as to determine the time of its contact with the index-plate F, and also to enable it to be adjusted for use with index-plates having different numbers of teeth, a set-screw, $n^5$, is placed within the outer side, near the front end of the arm $n'$, in such position as to enable the inner end of said screw to engage with the outer side of the tail-piece $n^4$. As thus arranged, whenever said tail-piece impinges upon said screw the inward movement of the engaging end of said pawl is arrested, so that by turning said set-screw inward or outward the inward movement of the engaging end of said pawl will be correspondingly decreased or increased.

Each index-plate is locked in place by means of a pawl, G, which is pivoted upon the head C and has its free end held with a yielding pressure in engagement with the teeth $f$ of said plate by means of a spring, $g'$, that is secured to said head and bears upon the outer side of said pawl. In order that the latter may be released from engagement at the proper time, it is provided upon the outer side of its free end with a lug, $g^2$, which extends downward, outward, and then downward, and behind its lower outer portion, $g^3$, passes an arm, $n^6$, that projects forward from the arm $n'$.

The retraction of the operating-pawl $n^2$ is caused by an outward movement of said arm $n'$, which movement also causes said locking-pawl to be lifted out of engagement, while upon the inward movement of said arm said operating-pawl, which has dropped into the tooth next in rear of that before engaged by said locking-pawl, moves said index-plate forward the required distance by the time that said locking-pawl is permitted to re-engage therewith. Said operating and locking pawls occupy different planes vertically. Both are engaged with the same notch at the termination of each forward movement of said index-plate.

One complete revolution of a quill D is required for the cutting of a stack of wheels, and when such has been had the actuating mechanism is thrown out of gear by mechanism hereinafter described.

In order that the operating-pawl $n^2$ may be lifted out of engagement with an index-plate and held out of such engagement while the head C is being partially rotated, the ring H is provided with an arm, $h^4$, which extends radially outward from a suitable point upon its periphery, and upon its end has a lug, $h^5$, that is arranged longitudinally in a line with the periphery of said ring. From its rear end the outer face of said lug has a forward and outward inclination for about one-half its length, and when said ring is moved rearward said lug passes behind a lug, $n^7$, which extends upward from near the front end of said pawl $n^2$ and operates to swing the latter outward. The pawl $n^2$ operates upon an index-plate F through an opening, $c^4$, in the periphery of the vertical portion of the flange $c^2$ of the head C, and after being swung outward by means of the lug $h^5$ is held in such position until, by the rotation of the head C, the solid portion of said flange comes opposite to said pawl, and when released by the withdrawal of the lug $h^5$ from engagement with the lug $n^7$ said pawl bears against said flange until the opposite opening $c^4$ permits it to move into engagement with the other index-plate.

Between the housing B and the frame A is placed a slide, P, which is fitted upon and adapted to slide longitudinally over a vertical way, $a$, that is provided upon the front side of said frame. Said slide is thus moved upon its said way by means of a lever, Q, which is pivoted centrally within said frame and has its front end in pivotal engagement with the central portion of the slide and its rear end in engagement with a peripheral groove, $r$, that is formed within a cam, R. Said cam is secured to and rotates with the driving-shaft K, and is so timed as to cause said slide to move slowly from the upper limit to the lower limit of its motion and then to return rapidly to said upper limit again.

Journaled horizontally within suitable bearings, $p$, upon the front upper portion of the slide P is an arbor, S, which is provided near one end with a belt-pulley, $s$, by means of which it is caused to revolve. At a point directly in rear of and in a line axially with the rear quill D a cutter, T, secured within or upon said arbor, completes the mechanism, the operation of which is as follows, viz: The front quill D being supplied with an arbor E that has secured thereon a stack of wheel-blanks, the ring-arm $h$ is moved to the rear limit of its motion, so as to unlock and engage with the head C, and is then moved forward to the opposite limit of its motion, by which means said head is given one-half of a revolution and the newly-filled arbor is brought into position in front of the cutter T, after which the machine is set in motion.

The cutter T is caused to revolve and by the action of the slide P is moved slowly downward, so as to cut a groove within the peripheries of each of the wheel-blanks, after which the slide moves upward. The arbor E, moving with its quill D, is given the predetermined fractional rotation, and the operation of said cutter is repeated.

When the arbor E has made an entire revolution and all of the teeth of the wheels have been cut, the rotating mechanism ceases to act and the journaled head C is given another half-revolution, so as to bring a newly-filled arbor into position for the action of the cutter T, during which action the completed wheels are removed and replaced by blanks. This enables the operation of cutting the wheel-teeth to be practically continuous, as the only interruption of the action of the cutter is while an arbor filled with completed wheels is being removed from and an arbor filled with blanks simultaneously placed in position before the cutter.

While any of the usual mechanism for starting and stopping the driving-shaft may be employed, I preferably use that shown in the drawings, which is constructed as follows, viz: The pulley $l$ is loosely journaled upon the shaft L, and upon the latter, adjacent to the inner face of said pulley, is a sleeve, U, which is capable of independent longitudinal motion thereon, but is compelled to rotate with said shaft. The inner end of the hub of said pulley and the contiguous end of said sleeve are provided with clutch-faces, and by moving said sleeve against said pulley said faces will be engaged and the shaft L compelled to revolve with said pulley, while by moving said sleeve or clutch away from said pulley circumferential connection between said parts will cease and said shaft will be no longer rotated. The clutch-sleeve U is engaged by the forked end $v$ of an L-shaped lever, V, which is pivoted in rear of the same, and by motion upon its vertical pivotal bearing is adapted to move said clutch lengthwise of the shaft L. To the opposite end, $v'$, of said lever is pivoted one end of a rod, W, which rod from thence extends forward and has its opposite end pivoted upon a radial arm, $x$, of a rock-shaft, X, that is journaled upon a vertical axis near the transverse center of the frame at the rear side of the housing B. The rock-shaft X is provided with a second arm, $x'$, which projects outward and forward in position to be engaged by a cam-lug, $h^6$, that is secured to or upon the ring H, such engagement being had at the instant when the latter has been turned forward to give to the journaled head a half-revolution, and the effect being to move said rock-shaft upon its bearings, so as to draw forward upon the connecting-rod W and through the lever V to move the clutch U into engagement with the pulley $l$, the effect being to automatically set the operative parts of the machine in motion whenever said journaled head is turned a step forward. When the clutch U has been thus moved into engagement with the driving-pulley, the parts are locked into place by means of a bar or latch, Z, which is pivoted centrally upon and at substantially a right angle to the arm $x$, and at its rear end is notched and adapted to engage with a lug, $a$, upon the frame A. A spring, $z$, operates to hold said latch in yielding contact with said lug, and when the rock-shaft X is moved so as to throw said clutch into engagement said latch is pressed automatically into engagement with said lug and operates to lock said parts in place.

It being desirable that the operative parts should cease their movement at the instant when the operative quill has made one complete revolution, the index-plate F of each quill is provided upon its lower side with a radial lug, $f'$, which has such length and relative location as to cause it, when its plate occupies the rearmost position, to engage with the tail of the latch Z at the instant when said plate has completed one revolution and to turn said latch upon its pivotal bearing until its notched end is released from engagement with the lug, $a$, when, by the action of a spring, $x^2$, upon the rock-shaft X, said rock-shaft is turned upon its axis and the clutch U withdrawn from engagement with the driving-pulley.

Having thus described my invention, what I claim is—

1. As an improvement in means for cutting the teeth of wheels, an organization in which are combined a journaled head that is adapted to be partially rotated upon its axis, two wheel arbor-holding quills which are journaled within said head and are each adapted to be rotated step by step when caused to occupy a certain predetermined position by the rotation of said head, and a rotating cutter that is adapted to move lengthwise of the wheel-arbor of the active quill between each of its partial rotations, substantially as and for the purpose specified.

2. As an improvement in means for cutting the teeth of wheels, an organization in which are combined two or more wheel-arbor-holding quills that are adapted to have a step-by-step rotation when brought into position before a cutter and to remain at rest when moved away from said cutter, substantially as and for the purpose shown.

3. As an improvement in means for cutting the teeth of wheels, a mechanism in which there are combined with a rotatable index-plate a rock-shaft that has one of its arms moved toward or from said index-plate by suitable means, a pawl which is pivoted upon said arm and by such action is adapted to engage with the toothed periphery of said index-plate, and an adjustable stop that is adapted to regulate the movement of said pawl upon its pivotal bearing and thereby determine the peripheral travel of its engaging end, substantially as and for the purpose set forth.

4. As an improvement in means for cutting the teeth of wheels, a mechanism in which are combined a rotatable index-plate, a rock-shaft arm that carries an operating-pawl and by its movements toward and from said index-plate causes said pawl to move over or upon the periphery of the same, and a locking-pawl that is adapted to engage with the toothed periphery of said index-plate and is lifted out of such engagement by the movement of said arm which retracts said operating-pawl, substantially as and for the purpose shown and described.

In testimony that I claim the foregoing I have hereunto set my hand this 14th day of May, 1886.

FRANK LEMAN.

Witnesses:
GEO. S. PRINDLE,
CARLOS H. SMITH.